(12) United States Patent
Kanamori et al.

(10) Patent No.: US 7,301,699 B2
(45) Date of Patent: Nov. 27, 2007

(54) DISPLAY DEVICE HAVING REFLECTING MEMBER WITH MULTIPLE REFLECTING SURFACES

(75) Inventors: Naohito Kanamori, Yokkaichi (JP); Yayoi Hatanaka, Nagoya (JP)

(73) Assignee: DENSO CORPORATION, Kariya (JP)

( * ) Notice: Subject to any disclaimer, the term of this patent is extended or adjusted under 35 U.S.C. 154(b) by 196 days.

(21) Appl. No.: 11/044,174

(22) Filed: Jan. 28, 2005

(65) Prior Publication Data

US 2005/0162738 A1   Jul. 28, 2005

(30) Foreign Application Priority Data

Jan. 28, 2004   (JP)   ............... 2004-019714

(51) Int. Cl.
*G03B 21/56* (2006.01)
(52) U.S. Cl. ............ 359/449; 359/460; 359/630
(58) Field of Classification Search ......... 353/10–14, 353/69; 340/980; 350/1, 630–631; 345/1, 345/7–11; 359/1, 449, 460, 630–631
See application file for complete search history.

(56) References Cited

U.S. PATENT DOCUMENTS

| 2004/0183750 A1 * | 9/2004 | Nagano et al. | 345/7 |
| 2004/0190280 A1 * | 9/2004 | Matsushita | 362/31 |

FOREIGN PATENT DOCUMENTS

| JP | A-H03-118593 | 5/1991 |
| JP | 6-47927 U | 6/1994 |
| JP | 2001-125496 A | 5/2001 |
| JP | 2002-156916 A | 5/2002 |
| JP | 2002-297047 A | 10/2002 |
| JP | 2003-161906 A | 6/2003 |

OTHER PUBLICATIONS

Notification of Reasons for Rejection and its translation from Japanese Patent Office for corresponding Japanese patent application No. 2004-019714 dated Apr. 25, 2007.

* cited by examiner

*Primary Examiner*—Diane Lee
*Assistant Examiner*—Robert Do
(74) *Attorney, Agent, or Firm*—Posz Law Group, PLC

(57) ABSTRACT

A display device includes a liquid crystal display (LCD) panel, a light emitting diode (LED), and a reflector. The reflector having the first, the second, and the third reflecting surfaces is arranged in the rear of an LCD screen of the LCD panel. The first reflecting surface is arranged parallel to the LCD screen. The light source is arranged between the LCD screen and the LED such that a main axis of light emitted from the LED is parallel to the LCD screen. The second reflecting surface is arranged such that the light is reflected off the second reflecting surface toward the LCD screen. The third reflecting surface is arranged such that the light is reflected off the third reflecting surface toward the first reflecting surface and transmitted to the LCD screen. With this configuration, the amount of the light is less likely to be reduced when the light passes through a light guiding member and the brightness of the LCD screen is increased. Moreover, distances between the first reflecting surface and the LCD screen are about the same in the entire LCD screen, and therefore the brightness of the LCD screen is uniformed.

7 Claims, 2 Drawing Sheets

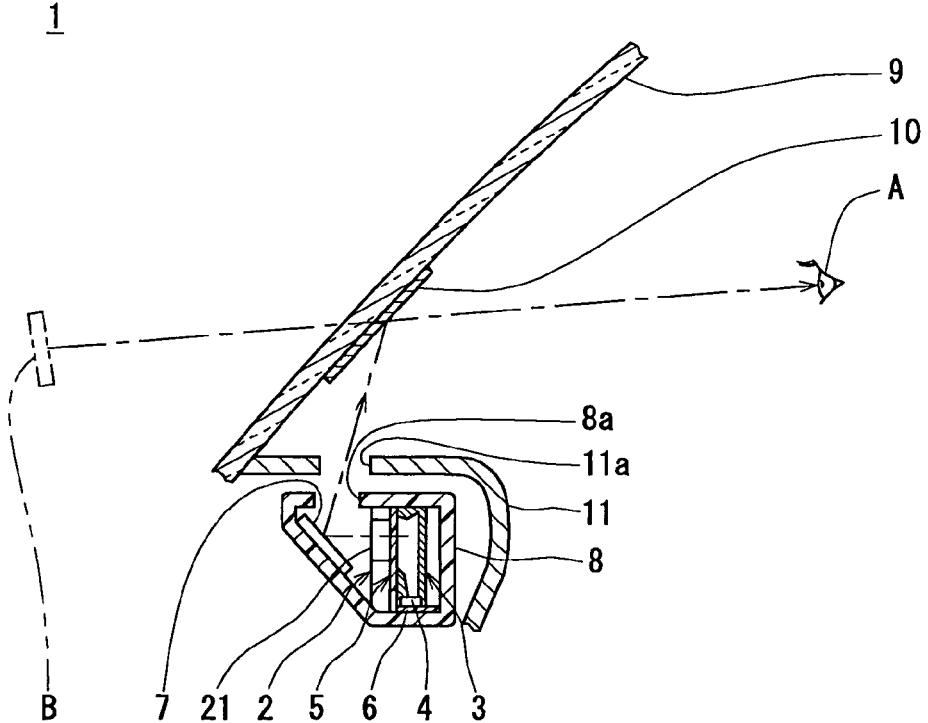
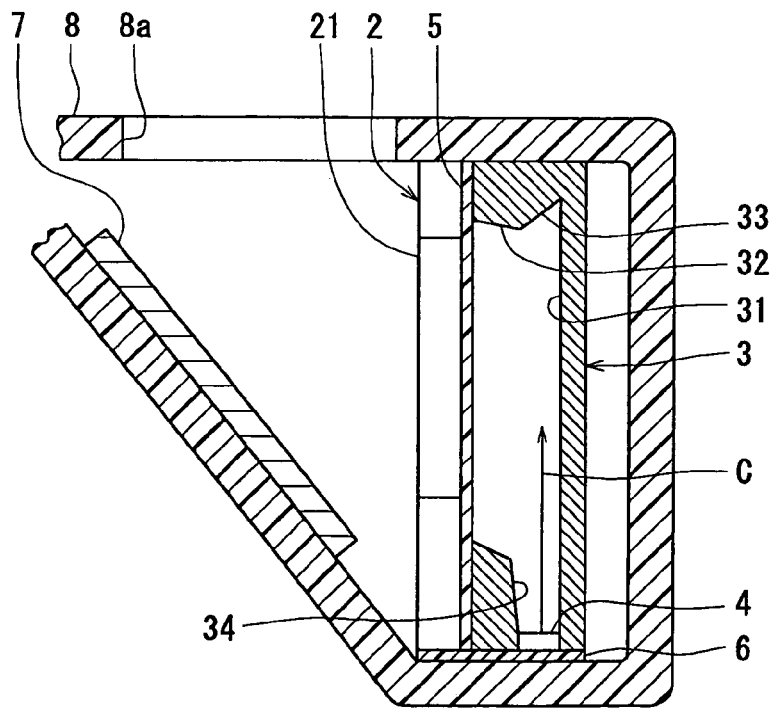

DISPLAY DEVICE HAVING REFLECTING MEMBER WITH MULTIPLE REFLECTING SURFACES

CROSS REFERENCE TO RELATED APPLICATION

This application is based on and incorporates herein by reference Japanese Patent Application No. 2004-19714 filed on Jan. 28, 2004.

FIELD OF THE INVENTION

The present invention relates to a vehicular display device installed near a driver's seat for providing various kinds of visual information about a vehicle.

BACKGROUND OF THE INVENTION

In many vehicular display devices, display areas are backlighted by light sources. An illuminator for lighting a display is proposed in JP-A-3-118593. In the illuminator, a light source is arranged so that light enters into an optical guiding plate from an entry-end surface and leaves the optical guiding plated from an exit-side surface, which is a front surface of the optical guiding plate. The optical guiding plate has a reflecting surface opposed to the exit-side surface and the reflecting surface reflects the light toward the exit-side surface. As a result, a plane area is lighted. A dial of a meter can be backlighted with this illuminator.

A rear surface of the optical guiding plate is curved such that the optical guiding plate becomes thinner toward to the end away from the light source. Therefore, a distance between the reflecting surface and the exit-side surface becomes smaller as the thickness of the optical guiding plate becomes thinner. Namely, brightness may not be uniform on the exit-side surface.

Furthermore, light emitted from the light source and traveling in the air are entered into the optical guiding plate. The light travels in the optical guiding plate and leaves it from the exit-side surface to the air. The optical guiding plate is usually made of light transmitting material, such as a transparent acrylic resign and a polycarbonate resin. A density of the air and the density of the optical guiding plate are different and therefore travel speeds of light in the air and in the optical guiding plate are different.

Namely, the travel speeds of light at entrance to the optical guiding plate and at exit from the optical guiding plate are different. Thus, the travel speed of light decreases at entrance to or at exit from the optical guiding plate. Moreover, some of the light emitted from the light source is reflected off interfaces of the optical guiding plate. Therefore, the amount of light passing through the interfaces is reduced, that is, the amount of light available for illumination is reduced.

The reduction in the amount of light causes reduction in brightness, or in uniformity of illumination on display members. To solve this problem, a brighter light source may be used. However, the cost of light source increases as the brightness increases, and the cost of the display device increases as the capacity of a light source driving circuit increases.

In another arrangement, a light source is positioned at the rear of a display member such that light emitted toward the display member and a diffusion sheet is used for diffusing light so that the display member is backlighted. To provide uniform brightness, a certain distance is required between the light source and the display member, namely, reducing the size of the display device is limited. Thus, installability of the display device in an instrument panel of the vehicle cannot be improved.

SUMMARY OF THE INVENTION

The present invention therefore has an objective to provide a display device in which light from a light source is efficiently used for illuminating a display member and the brightness of the display member is uniformed. A display device of the present invention includes a display member, a light source, and a reflector. The light source is arranged in the rear of the display member. The reflector is arranged in the rear of the display member such that it covers the rear surface of the display member. The reflector reflects light from the light source toward the display member. A display screen of the display member is backlighted with the light directly from the light source and via the reflector.

The reflector has the first, the second, and the third reflecting surfaces. The first reflecting surface is arranged substantially parallel to the display member. The second and the third reflecting surfaces are arranged at about the top end of the first reflecting surface between the display member and the first reflecting surface in this order toward from the display member side to the first reflecting surface side. The light source is arranged at about the bottom end of the first reflecting surface to emit light toward the top-end side of the first reflecting surface and a main light axis is substantially parallel to the display screen. The second reflecting surface is formed to reflect the light emitted from the light source toward the display screen. The third reflecting surface is formed to reflect the light toward the first reflecting surface and to enter the light reflected off the first reflecting surface into the display screen.

The light emitted from the light source travels in the air and directly enters the display screen or enters the display screen after reflected by the first, the second, and the third reflecting surfaces. The display screen is backlighted with the light. With this configuration, the amount of the light is less likely to be reduced when the light passes a light guiding member. The most part of the light enters to the display screen after reflected by the first reflecting surface. The first reflecting surface is arranged parallel to the display screen, namely, distances between the display screen and the first reflecting surface are about equal in the entire area of the display screen. Therefore, the brightness of the light entering to the display screen is substantially uniformed in the entire area of the display screen and the brightness of the display screen is uniformed. With this configuration, the light emitted from the light source is efficiently used for illuminating the display member and the brightness of the display member is uniformed.

BRIEF DESCRIPTION OF THE DRAWINGS

The above and other objectives, features and advantages of the present invention will become more apparent from the following detailed description made with reference to the accompanying drawings. In the drawings:

FIG. 1 is a schematic side view of a head-up display according to an embodiment of the present invention;

FIG. 2 is an enlarged partial view of the head-up display according to the embodiment;

DETAILED DESCRIPTION OF THE PREFERRED EMBODIMENT

Figure 3:
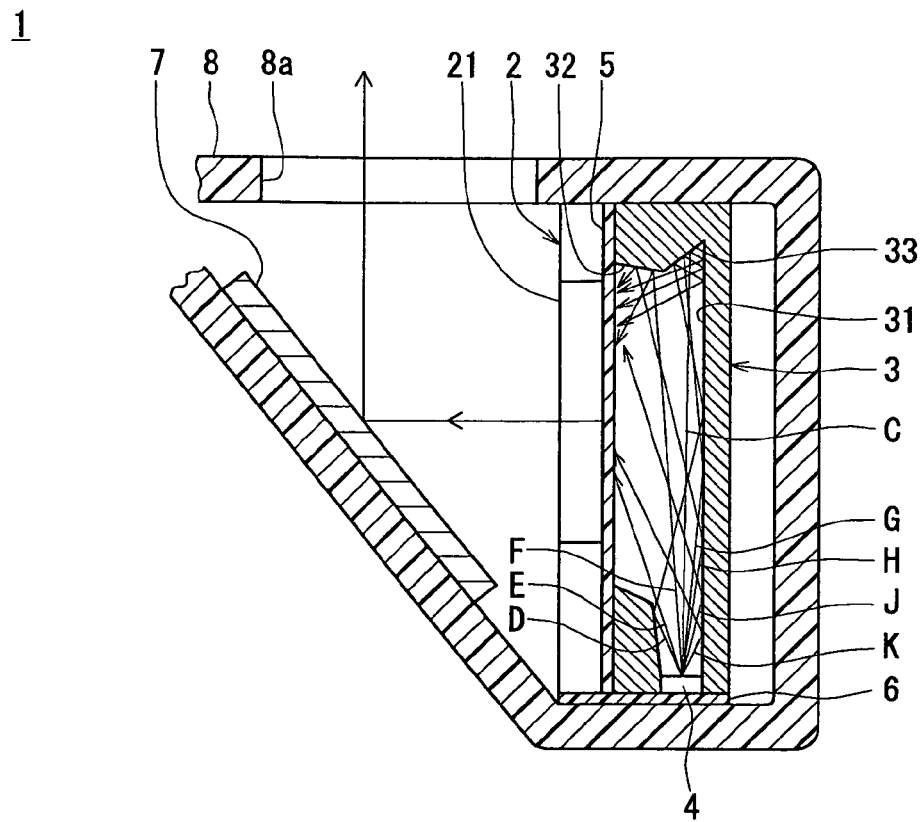
FIG. 3 is a schematic view of the head-up display with paths of light emitted from a light emitting diode according to the embodiment.

The preferred embodiment of the present invention will be explained with reference to the accompanying drawings. In the drawings, the same numerals are used for the same components and devices.

A display device of the present invention is applied to a head-up display 1 as shown in FIG. 1. In general, a head-up display projects light emitted from a light source and passed through the display device to a screen ahead of a driver, for instance, to a front windshield. Then, it forms a virtual image of the display screen ahead of the screen so that the driver can see the image while looking ahead.

The head-up display 1 includes a liquid crystal display (LCD) panel 2, a reflector 3, a light emitting diode (LED) 4, a reflecting mirror 7, and a half mirror 10. Images related to information about a vehicle are formed on the LCD panel 2 and light is emitted toward the half mirror 10 attached to an inner surface of a front windshield 9. The light is reflected off the half mirror 10 and travel toward a driver's eye A. The driver sees a virtual image B of the image that is formed on the LCD panel 2 ahead off the front windshield 9.

The LCD panel 2 has an LCD screen 21 on which information, including a vehicle speed, is displayed. The LED 4, which is a light source and a chip-type white LED, is arranged in the rear of the LCD panel 2, that is, on the right-hand side of FIG. 2. The LED 4 is arranged at about the bottom end of the first reflecting surface 31, that is, the lower side of FIG. 2 such that it emits light toward the top end of the first reflecting surface 31, that is, the upper side of FIG. 2 with its main light axis parallel to the LCD panel 2.

The reflector 3 is made of resin and provided in one piece. It is arranged in the rear of the LCD panel 2 such that it covers the LCD panel 2 and reflects light toward the LCD panel 2. The reflector 3 has the first reflecting surface 31, the second reflecting surface 32, the third reflecting surface 33, and the fourth reflecting surface 34. The first reflecting surface 31 is parallel to the LCD panel 2. The second reflecting surface 32 and the third reflecting surface 33 are located at about the top end of the first reflecting surface 31 between the LCD panel and the first reflecting surface 31.

The second reflecting surface 32 is located on the LCD panel side and the third reflecting surface 33 is located on the first reflecting surface side. The second reflecting surface 32 is sloped toward the LED 4 from the LCD panel side to the first reflecting surface side, namely, it is sloped toward the lower side of FIG. 2. The third reflecting surface 33 is sloped away from the LED 4 from the LCD panel side to the first surface side, namely, it is sloped toward the upper side of FIG. 2. The fourth reflecting surface 34 is located at about the bottom end of the first reflecting surface 31 such that it opposes to the first reflecting surface 31 and sandwiches the LED 4 with the first reflecting surface 31.

A diffusion sheet 5 is made of translucent resin film and arranged between the LCD panel 2 and the reflector 3. The diffusion sheet 5 diffuses and reflects the light that is reflected off the reflector 3 and transmitted to the LCD panel 2 so that the brightness of the LCD screen 21 is uniformed.

The LCD panel 2, the reflector 3, the LED 4, and the diffusion sheet 5 are positioned so that the brightness of the LCD screen 21 that is illuminated with the light emitted from the LED 4 and reflected off the reflector 3 becomes the maximum and even. A printed circuit board (PCB) 6, containing electric circuits of the head-up display 1 is arranged at about the bottom end of the reflector 3. The LCD panel 2 and the LED 4 are mounted on the PCB 6. The PCB 6 is an epoxy glass board or a flexible board.

Figure 4:
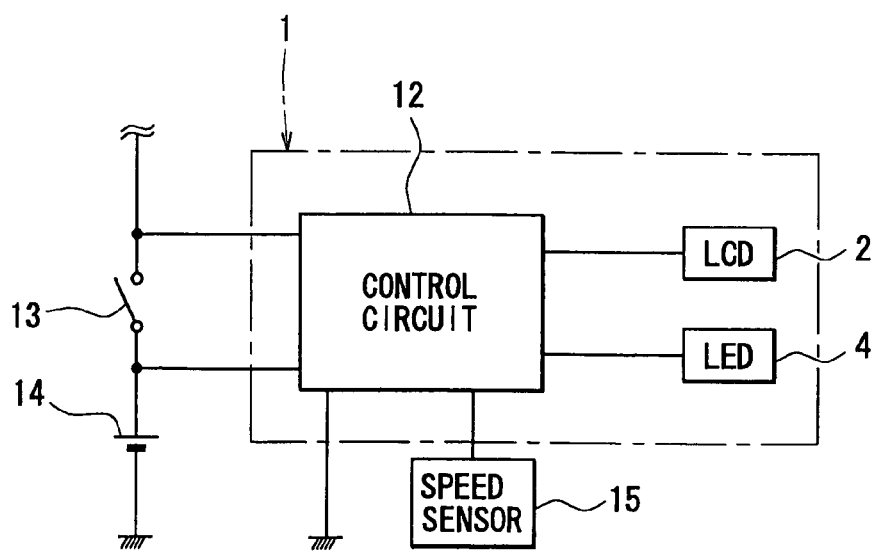
FIG. 4 is a block diagram of a control circuit included in the head-up display according to the embodiment.

A control circuit 12 shown in FIG. 4 is formed on the PCB 6. The control circuit 12 is provided in a form of a microcomputer for controlling tuning on and off of the LED 4. It also controls the LCD panel 2 for displaying vehicle speeds on the LCD screen 21 based on a detection signal from a speed sensor 15.

A reflecting mirror 7 is arranged on the opposite side of the LCD panel 2 to the reflector 3 for reflecting the light emitted from the LED 4 and diffused by the LCD screen 21 toward the half mirror 10 as shown in FIG. 1. The LCD panel 2 is reduced in size for fitting in the instrument panel 11. As a result, the LCD screen 21 is also reduced in size and displayed items on the LCD screen 21 are hard to read for the driver. To make them easy to read, a concave mirror is used for the reflecting mirror 7. The virtual image B is larger than the actual displayed items on the LCD screen 21. The driver can easily read the displayed items.

The LCD panel 2, the reflector 3, the LED 4, the diffusion sheet 5, and the reflecting mirror 7 are integrated and housed in a case 8. The case 8 is made of resin and has an opening 8a for passing the light from the reflecting mirror 7 toward the half mirror 10. The case 8 is fixed in the instrument panel 11. The instrument panel 11 has an opening 11a for passing the light from the reflecting mirror 7 toward the half mirror 10 via the case opening 8a.

The half mirror 10 is provided on the inner surface of the front windshield 9 by forming a metal-evaporated film on the surface in an area through which a line of vision of the driver passes when the driver gazes ahead during drive. The line of vision is indicated with alternate long and short dashed lines between the driver's eye A and the virtual image B in FIG. 1. The light emitted from the LED 4, transmitted through the LCD screen 21, and reflected off the reflecting mirror 7 is transmitted to the half mirror 10 as image forming light via the case opening 8a and the instrument panel opening 11a.

The image forming light is reflected off the half mirror 10 and transmitted to the driver's eye A. As a result, the driver can recognize the virtual image B of the LCD screen 21 ahead of the half mirror 10. The driver can also see the view ahead of the front windshield 9 through the half mirror 10. Therefore, the driver can see the virtual image B of the LCD screen 21 without moving his or her eyes while looking at the front view.

Paths of light emitted from the LED 4 are shown in FIG. 3. The first reflecting surface 31 has a larger area than the LCD screen 21 and covers an entire surface area of the LCD screen 21. The LED 4 is arranged at about the bottom end of the first reflecting surface 31, that is, the lower side of FIG. 3 to emit light toward the top end side of the first reflecting surface 31 with a main light axis C of the light parallel to the LCD screen 21.

The LED 4 emits light in a radial pattern. A light path D and a light path K are at the limits of a light path range. The light emitted from the LED 4 is transmitted to the reflector 3 except for a part of the light indicated with a light path F that is directly transmitted to the LCD screen 21. Namely, other light paths lead to any one of the first reflecting surface 31, the second reflecting surface 32, the third reflecting surface 33, and the fourth reflecting surface 34.

A part of the light reflected off the first reflecting surface 31 is transmitted to the LCD screen 21 as indicated with light paths K and J. Another part of the light reflected off the first reflecting surface 31 is reflected off the second reflecting surface 32 and transmitted to the LCD screen 21 as indicated with a light path H. Still another part of the light reflected off the first reflecting surface 31 is reflected off the second reflecting surface 32 and again reflected off the first reflecting surface 31, and transmitted to the LCD screen 21 as indicated with a light path G.

A part of the light reflected off the second reflecting surface 32 is transmitted to the LCD screen 21 as indicated with a light path F. A part of the light reflected off the third reflecting surface 33 is reflected off the first reflecting surface 31, and transmitted to the LCD screen 21 as indicated with a light path C, which is the main light axis C. A part of the light reflected off the fourth reflecting surface 34 is reflected off the first reflecting surface 31, the third reflecting surface 33, and again reflected off the first reflecting surface 31, and transmitted to the LCD screen 21.

The most part of the light emitted from the LED 4 is eventually reflected off the first reflecting surface 31 and transmitted to the LCD screen 21. Namely, the first reflecting surface 31 functions as a surface light source for backlighting the LCD screen 21. The first reflecting surface 31 is arranged parallel to the LCD screen 21. Therefore, the distances between the first reflecting surface 31 and the LDC screen 21 are equal in entire surface areas. Namely, the brightness of the light reflected off the first reflecting surface 31 is substantially uniformed in the entire surface area of the LCD screen 21 and the brightness of the LCD screen 21 is uniformed.

Furthermore, the most part of the light emitted from the LED 4 is transmitted directly to the LCD screen 21 or after more than once reflected off the reflecting surfaces 31 through 34. Namely, the most part of the light only travels in the air and enters the LCD screen 21. Thus, the amount of light is less likely to be reduced at an interface surface when the light enters into a light guiding member or exits from the light guiding member. Thus, the light emitted from the LED 4 is efficiently used for illuminating the LCD screen 21 in the head-up display 1.

Referring to FIG. 4, the control circuit 12 is continuously supplied with power by a battery 14. An ignition switch 13 is connected to the control circuit 12 in a manner that its operating condition, that is, turned on or off, is detectable. A speed sensor 15 is also connected to the control circuit 12 for inputting speed detection signals to the control circuit 12. The control circuit 12 controls on and off operation of the LED 4 based on the operating condition of the ignition switch 13. The control circuit 12 also controls the LCD panel 2 based on the speed detection signal inputted from the speed sensor 15 for displaying the vehicle speed on the LCD screen 21.

The control circuit 12 turns on the LED 4 when the driver turns on the ignition switch 13. At the same time, it controls the LCD panel 2 based on the speed detection signal for displaying the vehicle speed on the LCD screen 21. With the above operations, the LCD screen 21 is backlighted with the light transmitted directly from the LED 4 and via the reflector 3. The light transmitted through the LCD screen 21 is reflected off the reflecting mirror 7 and transmitted toward the half mirror 10 via the case opening 8a and the instrument panel opening 11a. The light is transmitted to the half mirror 10 as image-forming light. The image-forming light is reflected off the half mirror 10 and transmitted to the driver's eye A. The driver can see the virtual image B of the LCD screen 21 ahead of the half mirror 10. Namely, the drive can recognize the vehicle speed from the virtual image B.

In the head-up display 1, the second reflecting surface 32 and the third reflecting surface 33 are arranged in this order toward the first reflecting surface 31. The LED 4 is arranged at about the bottom end of the first reflecting surface 31 so that the light is emitted from the LED 4 toward the top end side of the first reflecting surface 31 and the main light axis C of the light is parallel to the LCD screen 21. The second reflecting surface 32 is formed so that the light is reflected toward the LCD screen 21. The third reflecting surface 33 is formed so that the light is reflected toward the first reflecting surface 31 and then reflected off the first reflecting surface 31 toward the LCD screen 21. Moreover, the fourth reflecting surface 34 is provided at about the bottom end of the reflector 3 for reflecting the light toward the first reflecting surface 31.

With the above configuration, the light travels in the air toward the LCD screen 21 directly or after reflected off the reflecting surfaces 31 through 34 and backlights the LCD screen 21. Thus, the amount of light is less likely to be reduced when the light passes through the light guiding member and the light emitted from the LED 4 is efficiently used for illuminating the LCD screen 21. Moreover, the LED 4 provides a long life of the light source at low cost.

The most part of the light is reflected off the first reflecting surface 31 toward the LCD screen 21. The first reflecting surface 31 is arranged parallel to the LCD screen 21. Namely, the distances between the first reflecting surface 31 and the LDC screen 21 are equal in entire surface areas. Therefore, the brightness of the light reflected off the first reflecting surface 31 is uniformed in the entire surface area of the LCD screen 21 and the brightness of the LCD screen 21 is uniformed. The light from the LED 4, which is a light source, is efficiently used and the brightness of the LCD screen 21 is uniformed. Namely, the brightness of the virtual image B is increased and uniformed.

The brightness of the LCD screen 21, or the brightness of the light that illuminates the LCD screen 21, is required to be increased so that the driver can maintain good image visibility. With the above configuration, the head-up display 1 provides sharp and clear images, that is, high image visibility.

Furthermore, the first, the second, the third, and the fourth reflecting surfaces 31, 32, 33, 34 are integrally formed in the reflector 3. Thus, the man-hours required for assembling the head-up display 1 is reduced and the relative positions of the first, the second, the third, and the fourth reflecting surfaces 31, 32, 33, 34 are precisely maintained. With this configuration, the light emitted from the LED 4 is effectively used and the brightness of the LCD screen 21 is uniformed.

The present invention should not be limited to the embodiment previously discussed and shown in the figures, but may be implemented in various ways without departing from the spirit of the invention. For example, the number of the LED 4 is not limited to one and more than one LED can be used. Another type of light source, including a light bulb, a discharge tube, and an electroluminescence panel, may be used.

The display device may be applied to display systems other than the head-up display. For instance, it can be used in a regular combination meter. In this case, the reflector 3 and the LED 4 may be arranged in the rear of a dial plate to be backlighted. The brightness of the dial plate is increased and bright spots are reduced. The same effects can be provided when the reflector 3 and the LED 4 are arranged in the rear of an LCD panel that is installed in a dial panel of a combination meter and directly seen by a driver.

What is claimed is:

1. A display device comprising:
a display member;
a light source arranged in a rear of the display member; and
a reflecting member arranged in the rear of the display member in a manner that the reflecting member covers the display member and reflects light emitted from the light source toward the display member, wherein
the reflecting member includes a first reflecting surface that is arranged substantially parallel to the display member so as to face the display member through air, the first reflecting surface having a first end and a second end opposite each other, a second reflecting surface and a third reflecting surface, the second and the third reflecting surfaces being arranged between the display member and the first reflecting surface,
the second and the third reflecting surfaces are arranged at about the first end of the first reflecting surface in this order from the display member toward the first reflecting surface,
the light source is arranged inside the reflecting member at about the second end of the first reflecting surface to emit light toward a side of the first end with a main light axis of the light substantially parallel to a display screen of the display member,
the display screen is backlighted with light that is transmitted directly from the light source and via the reflecting member,
the second reflecting surface is formed such that the light emitted from the light source is reflected off the second reflecting surface toward the display screen, and
the third reflecting surface is formed such that the light emitted from the light source is reflected off the third reflecting surface toward the first reflecting surface and transmitted to the display screen.

2. The display device according to claim 1, wherein:
the second reflecting surface is sloped toward the light source from a display screen side to the first reflecting surface; and
the third reflecting surface is sloped away from the light source from the display screen side to the first reflecting surface.

3. The display device according to claim 1, wherein the first, the second, and the third reflecting surface are integrally formed.

4. The display device according to claim 1, wherein the reflecting member further includes a fourth reflecting surface abut the second end of the first reflecting surface such that the light emitted from the light source is reflected off the fourth reflecting surface toward the first reflecting surface.

5. The display device according to claim 1, wherein light source is a light emitting diode.

6. The display device according to claim 1, wherein the display member is a liquid crystal display.

7. A head-up display for a vehicle comprising:
a display member;
a light source arranged in a rear of the display member; and
a reflecting member arranged in the rear of the display member in a manner that the reflecting member covers the display member and reflects light emitted from the light source toward the display member, wherein
the reflecting member includes a first reflecting surface that is arranged substantially parallel to the display member so as to face the display member through air, the first reflecting surface having a first end and a second end opposite each other, a second reflecting surface and a third reflecting surface, the second and the third reflecting surfaces being arranged between the display member and the first reflecting surface,
the second and the third reflecting surfaces are arranged at about the first end of the first reflecting surface in this order from the display member toward the first reflecting surface,
the light source is arranged at about the second end of the first reflecting surface to emit light toward the first end of the first reflecting surface with a main light axis of the light being substantially parallel to a display screen of the display member,
the display screen is backlighted with light that is transmitted directly from the light source and via the reflecting member,
the second reflecting surface is formed such that the light emitted from the light source is reflected off the second reflecting surface toward the display screen, and
the third reflecting surface is formed such that the light emitted from the light source is reflected off the third reflecting surface toward the first reflecting surface and transmitted to the display screen.

* * * * *